United States Patent [19]

Harris

[11] Patent Number: 5,129,634
[45] Date of Patent: Jul. 14, 1992

[54] AIRSPRING WITH PARTIAL RESTRAINING SLEEVE

[75] Inventor: John R. Harris, Uniontown, Ohio

[73] Assignee: The Goodyear Tire & Rubber Company, Akron, Ohio

[21] Appl. No.: 902,981

[22] Filed: Sep. 2, 1986

[51] Int. Cl.⁵ .............................................. F16F 9/04
[52] U.S. Cl. ................................. 267/64.24; 267/64.21; 280/711
[58] Field of Search .............. 267/64.21, 64.24, 64.27, 267/140.3, 145.4, 35; 280/711, 712

[56] References Cited

U.S. PATENT DOCUMENTS

| | | | |
|---|---|---|---|
| 107,034 | 9/1870 | Gardiner | 267/63 R |
| 2,133,279 | 10/1938 | Brown | 280/711 X |
| 2,979,326 | 4/1961 | Wilson, Jr. | 267/64.24 |
| 2,980,441 | 4/1961 | Timpner et al. | 267/64.21 |
| 3,035,799 | 5/1962 | Peirce | 267/140.3 |
| 3,046,000 | 7/1962 | Polhemus et al. | 267/64.21 X |
| 4,084,837 | 4/1978 | Milner | 267/63 R X |
| 4,274,655 | 6/1981 | Lederman | 267/8 R X |
| 4,332,397 | 6/1982 | Steger | 280/693 |
| 4,386,791 | 6/1983 | Watanabe | 267/64.21 X |
| 4,482,135 | 11/1984 | Ishida et al. | 267/8 R |
| 4,712,776 | 12/1987 | Geno et al. | 267/64.24 X |

FOREIGN PATENT DOCUMENTS

| | | |
|---|---|---|
| 210553 | 2/1987 | European Pat. Off. . |
| 218824 | 4/1987 | European Pat. Off. . |
| 225271 | 6/1987 | European Pat. Off. . |
| 1780370 | 12/1971 | Fed. Rep. of Germany . |
| 3631610 | 4/1987 | Fed. Rep. of Germany . |
| 2319813 | 2/1977 | France . |
| 409533 | 10/1966 | Switzerland . |
| 1020016 | 2/1966 | United Kingdom ............. 267/64.27 |
| 2117866 | 10/1983 | United Kingdom . |

Primary Examiner—George E. A. Halvosa
Attorney, Agent, or Firm—Marc. R. Dion, Sr.

[57] ABSTRACT

A vehicle suspension strut incorporating an airspring around a hydraulic shock absorber is disclosed. The unique airspring design and orientation relative to the shock absorber axis creates a side acting force which counteracts the bending torque acting on the strut during operation in a vehicle and prevents binding of the shock absorber piston. The horizontal side load is achieved using a partial restraining sleeve which circumferentially shrouds the flexible member of the airspring. The partial restraining sleeve extends less than half way around the circumference of the airspring flexible member and has a radius less than the fully inflated radius of the flexible member therby creating a restraining force on only one side of the flexible member of the airspring.

3 Claims, 7 Drawing Sheets

AIRSPRING WITH PARTIAL RESTRAINING SLEEVE

BACKGROUND OF THE INVENTION

This invention relates generally to strut type suspension members which utilize airsprings in conjunction with a damping member contained therein. In particular, conventional hydraulic shock absorbers provide the damping means and rolling lobe type airsprings provide the load support. The geometry used on helical spring strut suspensions for automobiles is such that the vehicle mass produces an angular displacement or torque which causes bending of the strut. This bending moment to the strut causes binding of the shock absorber piston which results in ride harshness. This harshness is pronounced at low amplitude undulation of the vehicle.

Methods known for creating horizontal acting side load in a vehicle suspension strut incorporating a hydraulic shock absorber and an airspring include utilizing an airspring piston eccentrically mounted on the shock absorber to create a non-symmetric rolling lobe in the flexible member of the airspring. Another alternative approach is to mount the airspring offset and at an angle to the shock absorber rod.

Yet another method includes cutting the flexible member of the airspring in a plane oblique to the shock axis and mounting the angled flexible member on an airspring to create an asymmetric roling lobe. All of these design methods create a degree of side load acting force which counteracts the bending torque placed on the strut rod by the mass of the vehicle. However, each of these methods delivers a limited amount of side load compensating force and it is highly desirable to be able to augment these side load compensating forces by utilizing additional side and compensating features in the strut design. It is to this objective of augmenting the side load compensating capability of an airspring based suspension strut that this invention is directed.

The object of this invention is to provide a suspension strut utilizing an airspring which generates side load compensating force. The force counteracts the bending torque created by the mass of the vehicle in operation and minimizes stiction in the hydraulic damper of the strut. This yields a softer ride. The airspring gives the ability to achieve variable spring rates as well as a constant vehicle height maintainable regardless of load by adjusting the internal pressure of the airspring portion of the strut. The side load compensating force is achieved by utilizing a partial restraining sleeve which restricts the radial expansion of the flexible member of the airspring around a limited portion of the circumference of the airspring. The partial restraining sleeve is positioned diametrically opposite to the line of action desired for the side load compensating force. The point of contact of the partial restraining sleeve to the flexible member is at a lesser distance from the strut axis than the unrestrained inflated radius of the flexible member of the airspring. This restraint of the flexibe member on only a portion of its circumference creates a side load compensating force on the airspring portion of the strut thereby providing the ability to offset the bending torque exerted by the sprung mass of the vehicle in which the suspension strut is mounted.

In another embodiment of the invention the partial restraining sleeve forms a part of a detachable volume can which is in pneumatic connection with the working volume of the airspring. This embodiment has the advantage of increasing the volumetric size of the airspring member while using little additional space. This is a substantial advantage in a vehicle suspension system in which the space envelope requirements are quite restricted and additional volume is difficult to achieve.

In other embodiments of the invention the partial restraining sleeve can be utilized along with an eccentrically mounted airspring piston or where the airspring is mounted offset and/or at an angel to the shock absorber axis of the strut.

BRIEF DESCRIPTION OF THE INVENTION

An embodiment is a rolling lobe airspring comprising an upper retainer; a piston having a centerline spaced axially away from said upper retainer; a flexible air impervious member having a first end sealably attached to said upper retainer and a second end sealably attached to said piston forming a sealed working cavity therebetween, said working cavity when pressurized, radially expands said member to an inflated radius; a rigid, partial restraining sleeve fixedly attached to said upper retainer extending parallel to said centerline, extending circumferentially less than the total circumference of said flexible air impervious member, said rigid sleeve having a radius measured from the less than the inflated radius of the flexible member, said rigid partial sleeve radially restraining less than the whole circumference of the flexible member to create a side load compensation force.

Another embodiment utilizes a detachable volume canister as volumetric supplement to the airspring. This embodiment is a rolling lobe airspring comprising an upper retainer; a piston having a centerline spaced axially away from said upper retainer; a flexible air impervious member having a first end sealably attached to said upper retainer and a second end sealably attached to said piston forming a sealed working cavity therebetween, said working cavity when pressured radially expanding said member to an inflated radius; a rigid volume can attached by member sealingly and detachably attaching to said upper retained, said volume can forming a suppemental cavity in communication with said working cavity.

Automotive suspension applications are the primary ones in which the side load compensation feature of the invention is most advantageous. An embodiment which utilizes the partial restraining sleeve is a suspension strut for connecting a sprung portion and an unsprung portion of a suspension system comprising a damper means having a rotational axis and including a tubular body having an axially moveable rod extending coaxially outward therefrom, said tubular body of said damper means being connected to said unsprung portion of the suspension by a mounting means and said rod being connected to said sprung portion of the suspension at an attachment point; and a roling lobe airspring operatively mounted surrounding said damper means to form a sealed pneumatic working cavity therearound, said airspring including an upper retainer; an airspring piston having a centerline spaced axially away from said upper retainer; a flexible air impervious member having a first end sealably attached to said upper retainer and a second end sealably attached to said piston forming the sealed pneumatic working cavity therebetween, said working cavity being pressurized to radially inflate said member to an inflated radius; a rigid partial sleeve fixedly attached to said upper retainer and extending axially parallel to said centerline and extending circumferentially less than the total circumference of said flexible air impervious member, said rigid sleeve having a radius measured from the centerline when fixedly attached which is less than the inflated radius of the flexible member, said rigid sleeve functioning to radially restrain less than the whole circumference of the membrane to provide a side load force.

DETAILED DESCRIPTION OF HE INVENTION

Figure 1:
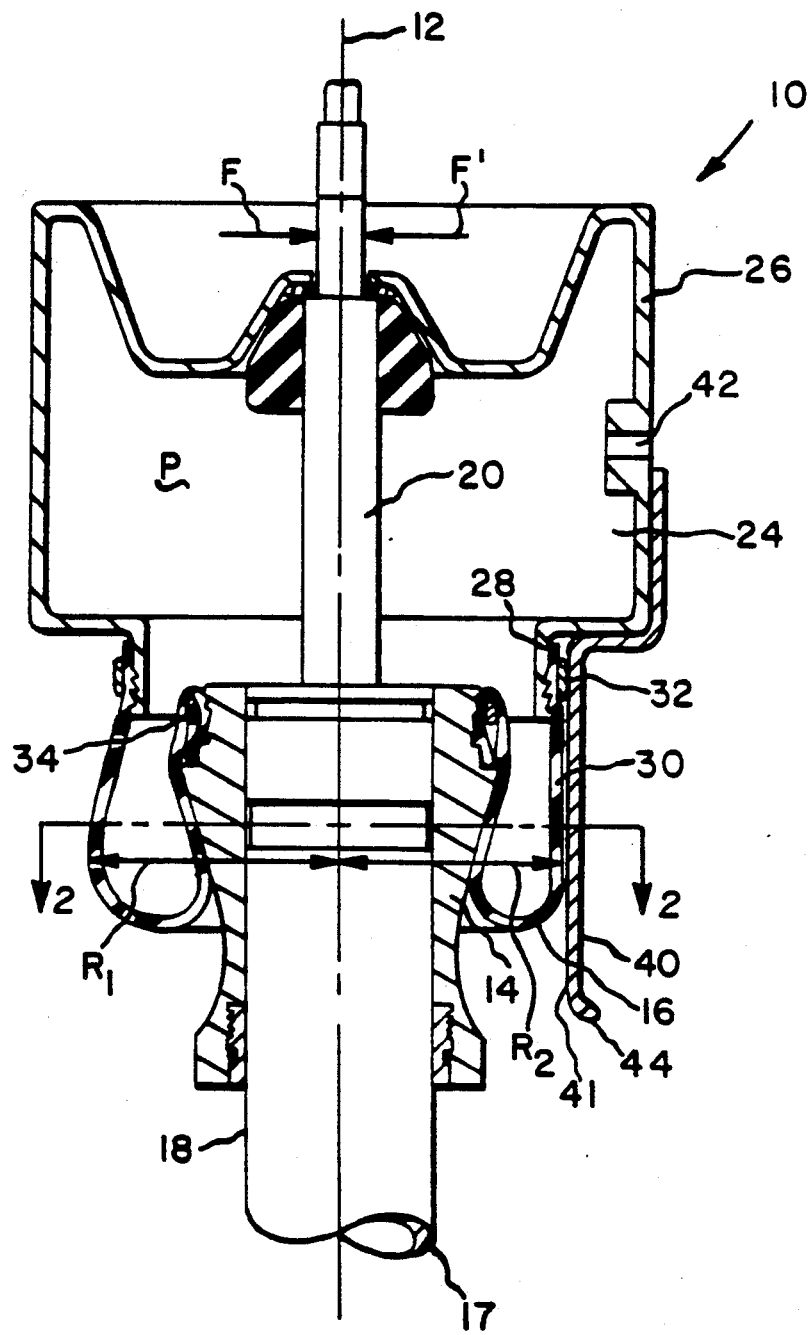
FIG. 1 is an embodiment of the invention shown in partial elevation and partial cross sectional view of an air strut suspension featuring the partial restraining sleeve of the invention encompassing less than the full circumference of the flexible member of the airspring portion of the strut.

FIG. 1 represents an air strut 10 which incorporates a conventional shock absorber 18 with a shock rod 20 extending axially outward from the outer body 17 of the shock absorber 18 securely fastened concentrically around the outer body is a piston 14 which is mounted such that the centerline of the piston, being defined as a line normal to the midpoint of the outside diameter of the bottom 14a of the piston 14, is coincident with the axis of rotation 12 of the shock absorber 18 and rod 20. Flexible rubber member 30 is sealingly attached to the piston 14 and at the opposite end to a volume can 26 by swage rings 32, 34 to form an internal pneumatic working cavity 24.

The flexible members are conventional in rolling lobe airsprings as set forth generay in U.S. No. 3,043,582 and 3,897,941, which are incorporated herein by reference.

The critical structural element of this invention which is added to the air strut 10 is the rigid restraining sleeve 40 which extends axially downward from the upper retainer 28 which takes the form in this embodiment of the volume can 26. The rigid retaining sleeve 40 is attached to the upper retainer 28 by any suitable means which maintains the air seal in the pneumatic working cavity 24. The restraining sleeve 40 has a radius $R_2$ which is measured from the axis of rotation 12. The flexible rubber member 30 achieves and maintains an inflated radius $R_1$ when the internal pneumatic working cavity 24 is pressurized to the desired working pressure P through the inet port 42. This inflated radius $R_1$ of the flexible member is generally a constant for the air strut given a fixed working pressure P in the working cavity 24 at the neutral axial position. In order to achieve the desired side load compensating force in the air strut 10 of this invention, $R_2$ must be less than $R_1$. That is, the radius of the restraining sleeve 40 must be less than the inflated radius $R_1$ of the flexible member. This difference in $R_2$ and $R_1$ creates a differential force F normal to the portion of the flexible member 30 which is restrained by the restraining sleeve 40 and creates a side load compensating force F'. This force F' counteracts the angular force F created by the sprung mass of the vehicle which manifests itself as a force which tends to bind the rod 20 during low amplitude and low frequency oscillation of the strut 10 in the suspension. This force F becomes more pronounced as the force or load is delivered at greater angles compared to the axis 12 of the strut.

This radius, $R_2$, is defined as the radial distance from the axis to the point of contact between the inner peripheral surface $R_1$ of the sleeve 40 and the flexible member 30. It is understood that this radius, $R_2$, is not necessarily dimensionally equivalent to the geometric radius of the sleeve itself. The sleeve may be mounted non-concentrically to the axis 12. FIG. 2a is an embodiment of the invention, shown in a radial cross-section similar to FIG. 2, in which the geometric radius $R_G$ of the rigid sleeve 40' is different from the radius $R_2$ which is measured from the axis A. The center point of $R_G$ is not axis A, but rather another point as shown. Thus, in this embodiment, the geometric radius $R_G$ of the sleeve may be greater than the inflated radius $R_1'$ of the flexible member 30'. But in accordance with the requirement of this invention, radius $R_2'$ of the sleeve is less than the inflated radius $R_1'$ of the flexible membrane 30'. The radius $R'_1$ must be measured as the distance from axis A to the point of contact between the sleeve 40' and the flexible member 30'. This relationship assures that the sleeve 40, 40' restrains the flexible member 30, 30' to create the side loading force.

Figure 2:
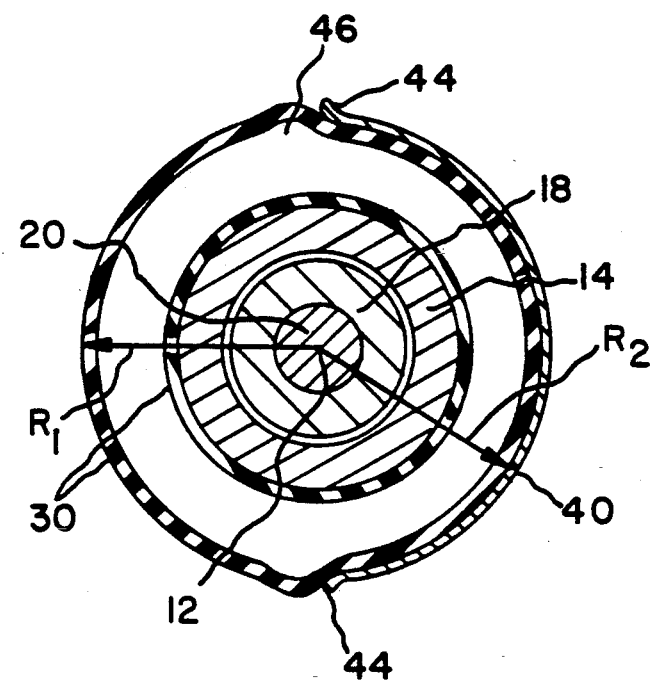
FIG. 2 is a radial cross section of the air strut of FIG. 1 taken along line 2—2 showing the partial restraining sleeve.
Figure 2A:
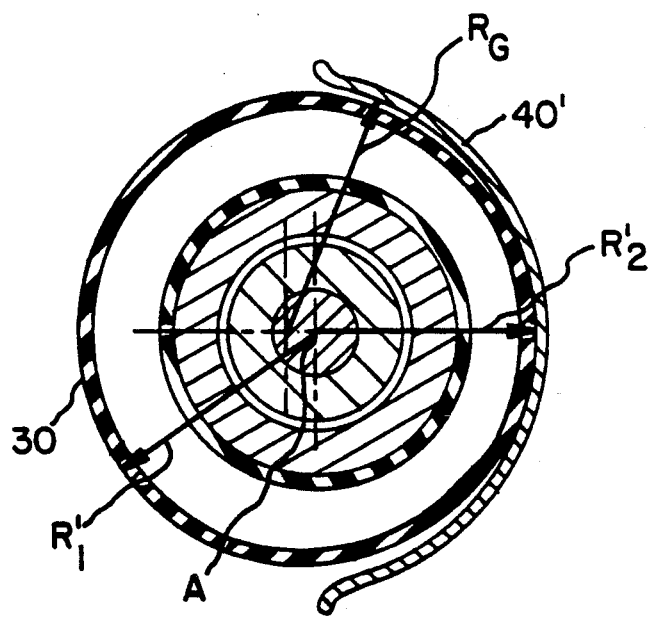
FIG. 2(a) shows another embodiment in axial cross section in which the partial restraining sleeve contacts the flexible member of the airspring over less than its full inner peripheral surface.

FIG. 2 is taken along line 2—2 on FIG. 1 to more clearly show the structure of the partial restraining sleeve 40. The restraining sleeve must cover only a portion of the circumference of the flexible member 30 in order to create the desired side loading force F'. The embodiment illustrated in FIG. 2a, the restraining sleeve, covers approximately 120° of the circumference of the flexible member. The amount of side load compensating force provided by the restraining cylinder is roughly proportional to the proportion of the circumference of the flexible member which is restrained by the restraining sleeve. In theory, it is believed that as low as point contact up to half or 180° of the circumference may be effective to create some force. Obviously, beyond 180° of coverage there is proportionally less side loading force directed in the desired direction due to off setting force vectors on opposite sides of the restrained flexible member 30. Such a configuration might be useful in certain specific applications. Preferred is 30°–180°, more preferred is 45°–130°, most preferred is 50°–120°. The positioning of the contact area of the restraining sleeve is critical since the side load compensating force delivered is normal to the center of the contact area between the restraining sleeve and the flexible member. That is to say that if there is a force that is to be counter balanced by the restraining sleeve, the sleeve should be positioned diametrically opposite the focal point of that force. In the case of a typical air suspension member, the practical obstruction of the wheel dictates that the restraining sleeve be positioned opposite the wheel in the suspension member so that no interference between the restraining sleeve and the wheel occurs during full jounce operation of the suspension member. Later figures will more clearly show the optimum positioning of the restraining sleeve relative to other portions of the unsprung suspension.

The restraining sleeve 40 should extend axially away from the upper retainer 28 sufficiently far so that the flexible member 30 is restrained through its full operating stroke. Thus, as the flexibe member 30 rolls axially downward over the contoured shape of the piston 14, the meniscus-shaped rolling lobe 16 moves downward over the piston and it is restrained by the restraining sleeve 40. The extreme axial end 16 of the sleeve is preferably smoothly radiused outward to assure that no sharp edges come in contact with the flexible member 30. Similarly FIG. 2 illustrates at the extreme circumferential ends 16 of the restraining sleeve 40 which is radiused outward to assure that the flexible member is protected in the area where the transition is made between the restrained portion and the unrestrained portion of the flexible member 30. A bulge 46 in the circumference of the flexible member 30 occurs at the extreme circumferential end 44 of the restraining sleeve 40. Any suitable shape for the end 44 which affords adequate protection to the integrity of the flexible member 30 and minimizes abrasion at that point is suitable.

Figure 3:
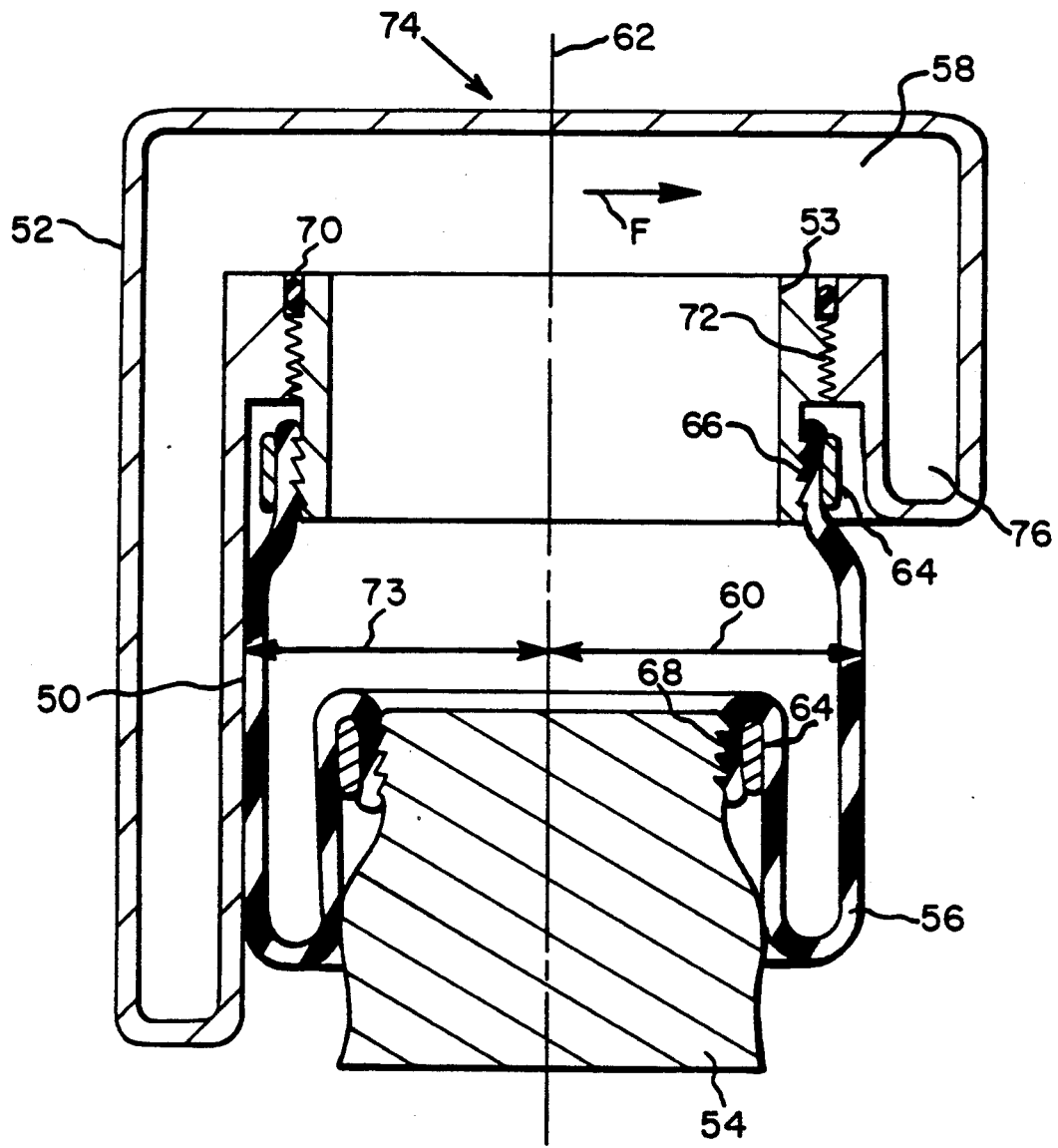
FIG. 3 is a cross sectional view of an airspring utilizing the partial restraining sleeve of the invention as part of a detachable volume canister.

FIG. 3 illustrates an alternative form of the invention in which the restraining sleeve is integral with a supplemental volume can. In FIG. 3. The partial restraining sleeve is shown on a simplified schematic of an airspring which may form a component of an air suspension member such as the one shown in FIG. 1 in combination with the damping member. A restraining sleeve 40 forms the radially innermost part of a detachable volume can 52. This volume can increases the effective volume within the airspring and changes the resulting spring rate without adding substantial bulk to the assembly. The airspring pictured is an otherwise conventional rolling lobe airspring having an upper retainer 53 and a piston 54 which are axially moveable relative to each other through a flexible member 56 which is sealably attached at one end to the upper retainer 52 and to the piston 54 at the opposite end thereof. The flexible member is conventional in the airspring art and is generally tubular in its non-inflated shape and any when the working cavity 58 is pressurized does the flexible member assume a natural formed shape having an inflated radius 60 measured from the centerline 62 of the piston. The swage rings 64 are utilized to sealingly attach the flexible member 46 to the upper retainer 54 and piston 54 in the serrated attachment zones 66 and 68.

The detachable volume can 52 may be attached to the upper retainer by any means suitable to maintain an air tight seal between the rigid upper retainer 43 and the volume can 52. An O-ring 70 is utilized along with threads 72 to attach and seal the volume can 52 to the conventional airspring assembly to create an airspring 74 which exerts a side load compensating force. This force g is generated by the interaction between the flexible member 56 and the partial restraining sleeve 50 which is the lower axial part of the volume can 52. This partial restraining sleeve portion 50 of the volume can extends less than the full circumference of the flexible member 56 and has an inside radius 73 which must be of lesser dimension than the normal inflated radius 60 of the flexible member 56. The side loading force produced by this unique airspring configuration is roughly proportional to the difference in radii 60 and 73. That is to say that the smaller the radius 73 becomes relative to the inflated radius 60 of the flexible member 56, the greater the sideload compensating force F becomes.

Figure 4:
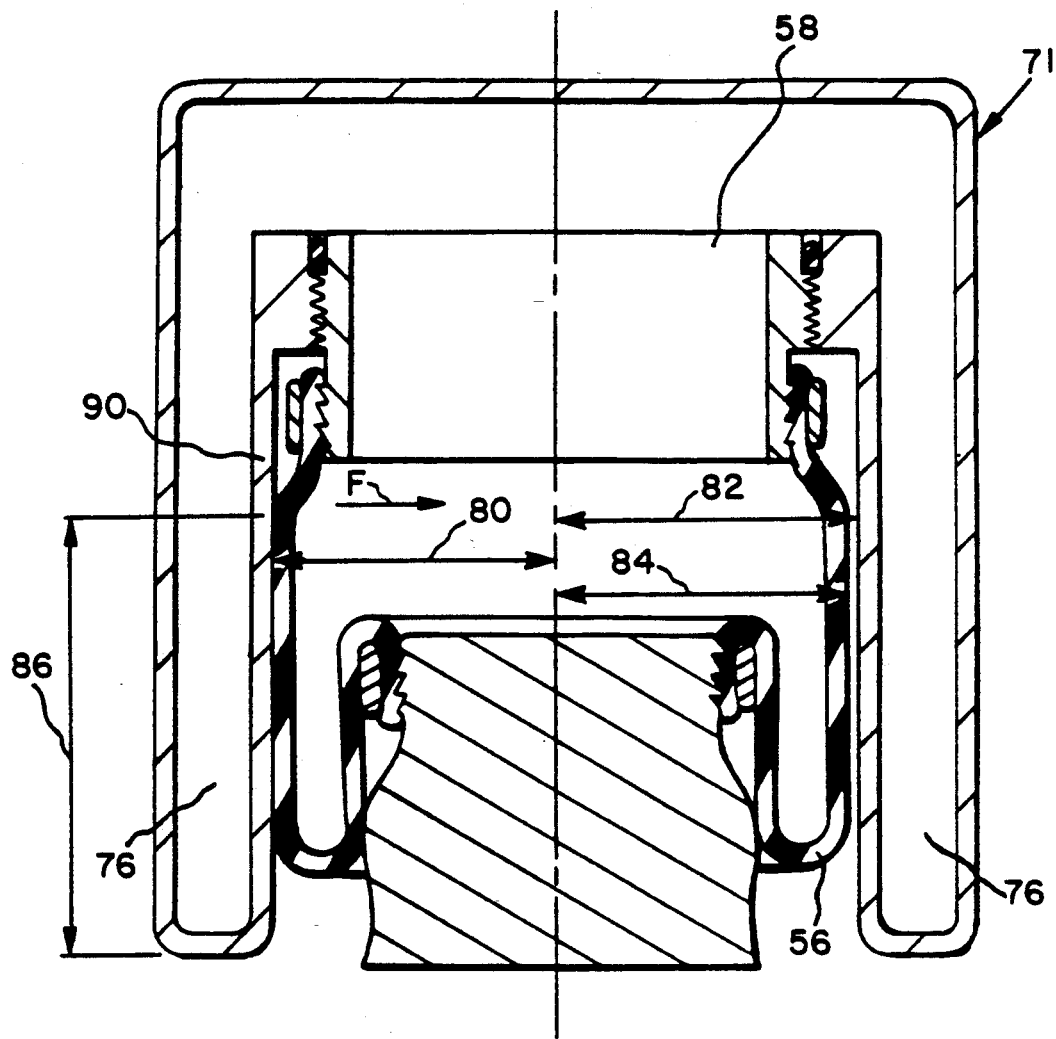
FIG. 4 is another embodiment of the invention showing an airspring utilizing the partial restraining sleeve as a part of a detachable volume canister.

FIG. 4 is identical in all respects to FIG. 3 except that the detachable volume can 71 includes around its full circumference an annular volumetric cavity 76 around the flexible member 56. The volume can in this embodiment serves as a full circumference restraining cylinder and yet is detachable to change the effective volume of the internal working cavity 58 of the airspring. It is to be noted that the volume can may preferably be oval or oblong in radial cross sectional shape such that the restrained radius 80 is less than the unrestrained radius 82 where both radii are measured from the centerline 62. Thus the unrestrained radius 82 is equal to or greater than the inflated radius 84 of the flexible member 56, while the restrained radius 80 is less than the inflated radius 84 of the flexible member 56. This configuration yields a side load force F normal to the center of the contact area 86 between the flexible member 56 and the restraining radius side 90 of the volume can 71. This side 90 serves as a partial restraining sleeve as described in other embodiments.

Alternative Strut Embodiments

The general concept of providing a restraining sleeve which extends only partially around the circumference of the flexible member of the airspring can be applied to many known configurations of air suspension strut in which side loading with its resultant stiction in the shock absorber may be encountered.

Figure 5:
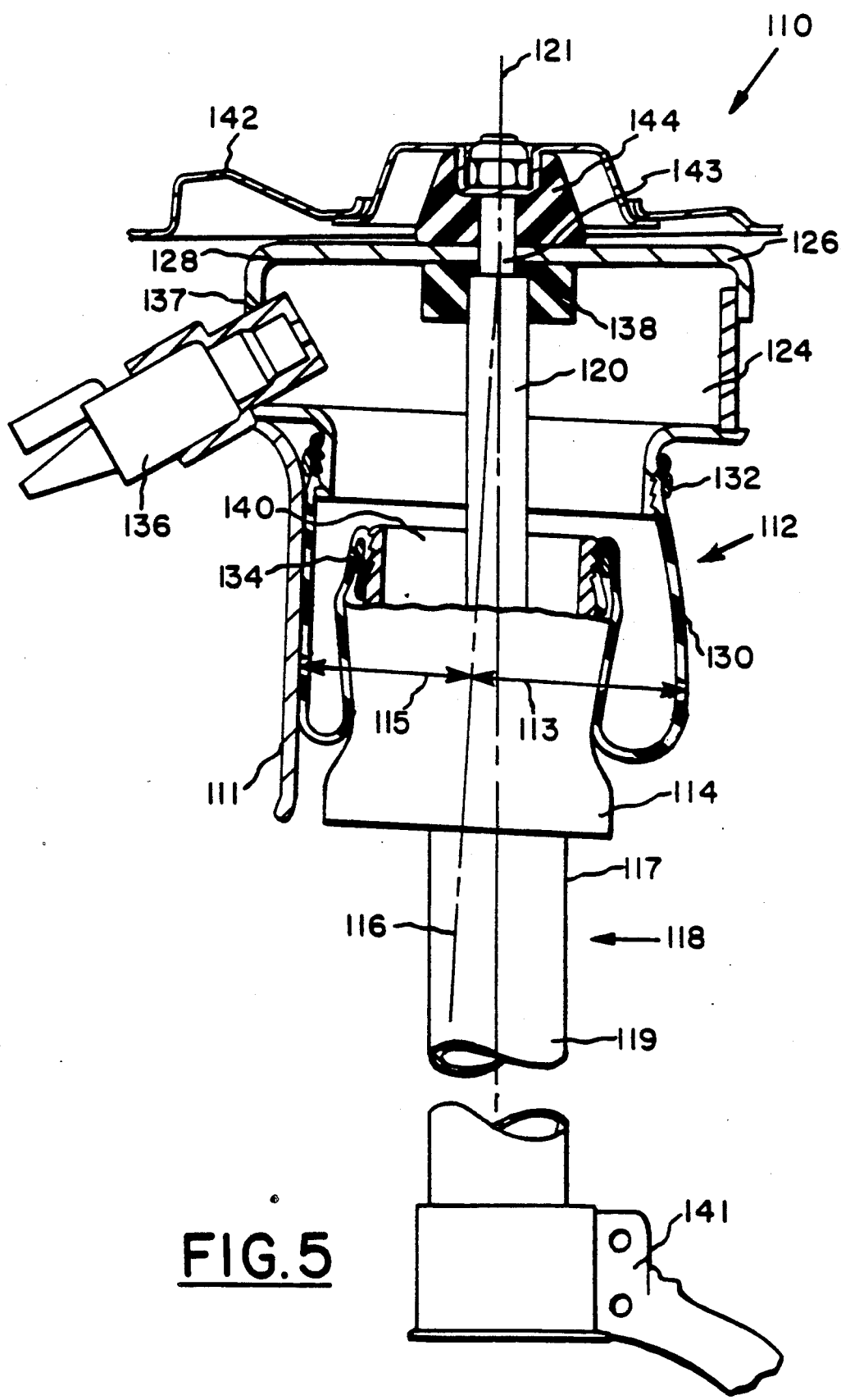
FIG. 5 is another strut embodiment in sectional view in which the partial restraining sleeve is utilized with an airspring in which the centerline of the piston is offset from the axis of the strut.
Figure 6:
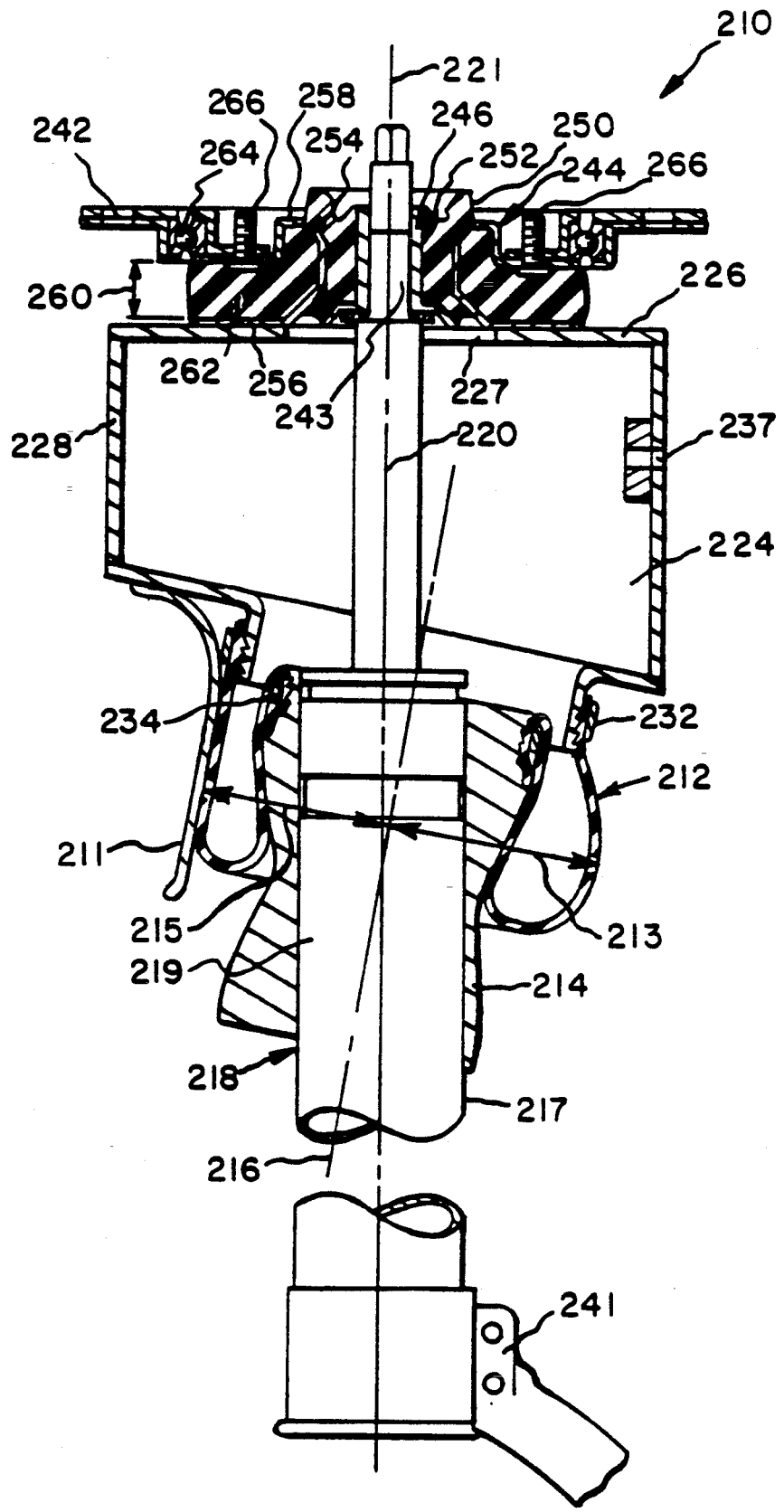
FIG. 6 is an alternative strut embodiment in sectional view utilizing the partial restraining sleeve of the invention in which the piston centerline and by shock absorber axis are offset and intersecting at a point other than where the strut rod passes through the upper retainer of the airspring.
Figure 7:
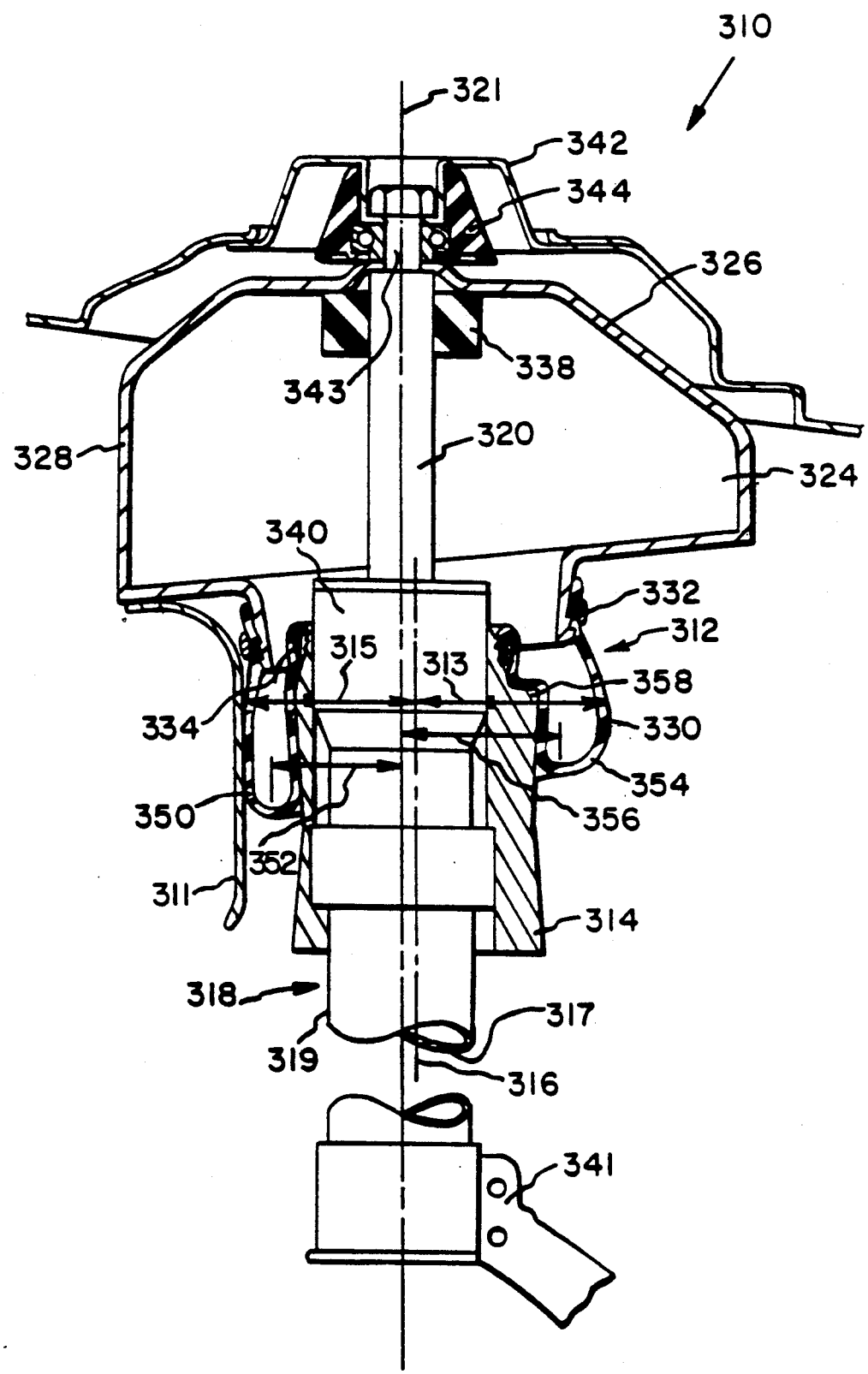
FIG. 7 is a strut embodiment in sectional view in which the partial restraining sleeve of the invention is utilized with a strut having an eccentricity mounted airspring piston.

FIGS. 5, 6 and 7 show related alternative embodiments of the invention featuring a partial restraining sleeve and other side-load compensating airspring design concepts. The beneficial effect of utilizing the restraining sleeve is cumulative with the other airspring characteristics with regard to generating augmented side load compensating force. An air suspension strut 110,210,310 is shown which utilizes a symmetrical airspring 112,212,312 having a piston 114,214,314 which has a centerline 116,216,316 defined as being normal to the midpoint of the outside diameter of the bottom 114a, 214a, 314a. The essential partial restraining sleeve 111,211,311 is attached to the upper retainer 126,226,326 and extends axially away from the upper retainer essentially parallel to or coaxially with the centerline 116,216,316 of the piston 114,214,314. The partial restraining sleeve 111,211,311 extends circumferentially around the flexible member 130,230,330 less than the full circumference. Preferably the sleeve extends less than half of the circumference and most preferably about 60 to about 120° around the circumference of the flexible member 130,230,330 when viewed in a radial cross section normal to the centerline 116,226,336 of the piston 114,214,314.

The flexible member 130,230,330 assumes an unconstrained, inflated radius 113,213,313 when the working cavity 124,224,324 is pressurized to the operational working pressure. In order for this invention to function optimally, the radius 115,215,315 of the partial restraining sleeve 111,211,311 must be less than the unconstrained, inflated radius 113,213,313 of the flexible member 130,230,330. This relationship is critical since the sleeve must exert a restraining force on the portion of the flexible member which is in contact with the sleeve. This restraining force creates a counteracting force which acts to balance the side loading force exerted on the strut by the sprung mass of the vehicle. This counteracting of the side loading force minimizes the bending torque on the damper rod 120,220,320 of the strut and greatly reduces stiction in the hydraulic damper of the strut.

The piston is mounted on the tubular body 117,217,317 of the damper means 118,218,318. The damper means 118,218,318 is a conventional shock absorber 119,219,319. The damper means contains a damping medium such as hydraulic fluid or oil. The rod 120,220,320 is axially movable within the outer body 117,217,317 and is connected to the damping medium through an axially movable piston. The axis 121,221,321 of the strut is also defined to be the axis of the rod and the damper means. In the struts 110,210 of FIGS. 5 and 6, the centerline of the airspring piston 116,216 is set at an acute angle relative to the axis 121,221 of the strut by having the airspring piston 114,214 securely fastened at the appropriate angle on the tubular body 117,217. FIG. 7 has an airspring piston 314 which is symmetric about the piston centerline 316 but the piston is mounted eccentrically about the strut axis 321. Piston centerline 316 and strut centerline 321 are parallel but non-coincident.

The airspring establishes a sealed pneugatic working cavity 124,224,324 around the operative portion of the damping means 118,218,318. The upper retainer 126,226,326 of the airspring is integral with a volume can 128,228,328 which is a rigid structure to which the flexible air impervious member 130,230,330 can be sealably attached utilizing swage being 132,232,332. The flexible member 130,230,330 is sealably attached at its opposite end to the upper portion of the piston 114,214,314 by swage ring 134,234,334 which establishes the enclosed volume of the working cavity 124,224,324. All the embodiments may be fitted with any suitable means for changing air pressure within the working cavity. FIG. 5 shows a pneumatic valve 136 inserted through an opening 137 in the wall of the volume can 128 to allow the inlet and exhaust of compressed air during operation of the air suspension strut 110. Any suitable means for selectively controlling the flow of gas into the working cavity may be utilized: U.S. Pat. Nos. 4,483,546 and 4,386,791 to Brearley teach a representative control system to provide a self-leveling or "active" suspension system. Use of such control means is within the contemplation of this invention. FIG. 6 has a planned opening 237 through which any suitable valve may be inserted if variable air pressure is a desired feature for the application. A jounce bumper 138,338 is positioned around the rod 120,320. The bumper 138,338 protects the upper portions of the strut from damage during full jounce operation. The upper portion of the piston 140,340 will impact the jounce bumper and rebound thus preventing damage. Similar bumpers may be utilized to advantage in all other embodiments of this invention.

The damper means 118,218,318 is connected to the unsprung portion 141,241,341 of the suspension by suitable attachment means. The upper retainer 126,226,326 and the rod 120,220,320 are connected to the sprung portion 142,242,342 of the suspension at an attachment point 143,243,343. In FIG. 6, the piston centerline 216 and strut centerline 221 intersect at a point other than the attachment point 243 where rod 220 goes through the aperture 227 in the upper retainer 226. This divergence of the lines of action of the spring and damper creates a torque or moment acting on the rod 220. Due to the torque or angular displacement stress which is placed on the point of attachment 243 of the rod 220 and the upper retainer 226 to the sprung portion of the suspension 242, a resilient mount 244 is utilized. The mount 244 is preferably made from resilient rubber or thermoplastic elastomer. It will be readily appreciated that any mounting means which functions to both absorb torque and cushion will be suitable for use in the airsprings of FIG. 6.

FIG. 6 differs from FIG. 5 primarily in the orientation of the centerline of the piston 216 relative to the rotational axis of the strut 221. In FIG. 6 the centerline of the piston 216 is set at an acute angle to the axis 221 of the rod. The centerline of the piston 216, when extended in an imaginary line to its intersection with the upper retainer 226 intersects at a point other than the attachment point 243. This is in contrast to FIG. 5 where the centerline of the piston 116 and the centerline of the strut 121 are offset at an acute angle but intersect exactly at the attachment point 143 where the upper retainer and the piston rod are fastened to the sprung portion 142 of the suspension.

In the embodiment of FIG. 6, the angular displacement or torque must be absorbed by the resilient mounting 244. Mount 244 is a dual path mount having an inner member 246 adapted to receive the rod 220 through a bore 248. A first elastomeric annular ring 250 of low shear elastomer is bonded to the outer peripheral surface 252 of the inner member 246 and to the outer peripheral surface 254 of an outer support member 256 which is adapted for attachment to the upper retainer 226. A suspension attachment member 258 is spaced axially apart from said outer member 256. The space 260 between these members is filled by a second annular ring 262 of elastomeric material. The second annular ring 262 is adapted for absorbing high compression load as the suspension attachment member 258 absorbs the weight of the sprung portion 242 of the automobile. The first annular ring 250 of low shear elastomer is adapted to absorb the shear stress created during cycling of the strut 210. This first annular ring 250 of elastomer is capable of absorbing this angular motion without transmitting that motion from the upper retainer 226 of the airspring to the rod 220. compression load between the sprung mass of the suspension and the air suspension strut 210 as it cycles through jounce and rebound during operation of the vehicle. These low frequency oscillations are damped by the second annular ring 262 of the mount 244. The mount 244 is provided with an annular bearing 264 which allows the strut 210 to rotate relative to the sprung portion 242 of the suspension. Attachment bolts 266 are provided as one means for attaching the mount to the sprung portion 242. The rod 220 of the strut projects through a bore 248 in the mount.

It will be readily appreciated by one skilled in this art that any mounting means may be utilized which provides a means for absorbing torque between the upper retainer 226 and the rod 220 while still providing for a means for absorbing compressive force between the sprung portion of the suspension 242 and the strut 210. Many designs for such mounting means are known and many others may be contemplated or designed to serve the function of mount 244 in any embodiment of this invention. Such mounts are preferably employed in struts according to FIGS. 1, 5, 6 and 7.

The design concepts set forth in FIGS. 1, 5-7 all feature airspring configurations which create a differential side-directed force which acts through the upper retainer of the airspring portion. If this torque or force is transmitted directly into the rod 120,220,320 then stiction will occur and the beneficial side load compensating action will be lost. The preferred mounting means provides for the direct transfer of the torque force into the vehicle frame 142,242,342 rather than into the rod, thus minimizing binding and stiction in the hydraulic damper during low amplitude/low frequency operation of the strut. This type of operation is encountered when the vehicle goes over small bumps in the road surface.

FIG. 7 embodies yet another aspect of the invention in which the side load compensating force is delivered by the airspring due to the partial restraining sleeve and a non-concentric mounting of the piston around the tubular outer body 317 of the damper 318. The centerline of the piston 316 lies generally parallel to the centerline of the strut 321. Unlike FIGS. 5 and 6, the centerline of the piston is not set at an angle to the centerline of the rod. The piston 314 is eccentric about the axis 321 of the strut. This eccentricity of the piston creates a non-symmetric form to the rolling lobe of the flexible member 330. The side load compensating force is created by the unbalanced meniscus form of the non-symmetric flexible member and the partial restraining sleeve 311. The meniscus 350 on the smaller radius side 352 yields a greater force on the smaller radius side 352 of the piston 314. FIG. 7 shows a short meniscus 354 on the larger radius side 356. The shoulder 358 provided in the larger radius side of the non-symmetric piston 314 further shortens the meniscus 354. The shoulder 358 is gradually blended into the radius of the piston 314 until the shoulder is very slight on the smaller radius side 352 of the piston. It should be noted that the eccentric piston with or without the shoulder 358 is effective to create side loading force during operation of the airspring. The shoulder 358 simply provides a greater side loading force and may be preferred in particular applications requiring greater force compensation. Since the line of action of the airspring and the damper 318 or shock absorber are substantially coincident in this embodiment, a simple resilient mount 344 is provided where the rod 320 and upper retainer 326 are fastened to the sprung portion 342 of the suspension at the attachment point 343. This elastomeric mounting means provides for pivotal or swivel-type movement of the rod 320 relative to the sprung portion 342.

Preferred embodiments of the invention have been shown and described for illustration purposes. It will now become apparent to those skilled in the art that various changes in the form and detail may be made without departing from the scope of the invention. Accordingly, the scope of the invention is set forth in the following claims.

What is claimed is:

1. A suspension strut for connecting a sprung portion and an unsprung portion of a suspension system comprising;
   (a) a damper means having a rotational axis and including a tubular body having an axially moveable rod extending coaxially outward therefrom, said tubular body of said damper means being connected to said unspring portion of the suspension by a mounting means and said rod being connected to said sprung portion of the suspension at an attachment point; and
   (b) a rolling lobe airspring operatively mounted surrounding said damper means to form a sealed pneumatic working cavity therearound, said airspring including an upper retainer, an airspring piston, having a centerline, spaced axially away from said upper retainer, a flexible air impervious member having a first end sealably attached to said upper retainer and a second end sealably attached to said piston forming the sealed pneumatic working cavity therebetween, said working cavity being pressurized to radially inflate said flexible member to an inflated radius, a rigid partial restraining sleeve fixedly attached to said supper retainer and extending circumferentially less than the total circumference of said flexible air impervious member, said rigid sleeve having a radius measured from the centerline when fixedly attached which is less than the inflated radius of the flexible member, said rigid sleeve functioning to radially restrain less than the whole circumference of the membrane to provide a side load force, wherein said flexible member has said first end cut in a plane perpendicular to said centerline and said second end cut in an non-perpendicular plane to said centerline.

2. A suspension struck for connecting a sprung portion and an unsprung portion of a suspension system comprising:
   (a) a damper means having a rotational axis and including a tubular body having an axially moveable rod extending coaxially outward therefrom, said tubular body of said damper means being connected to said unsprung portion of the suspension by a mounting means and said rod being connected to said sprung portion of the suspension at an attachment point; and
   (b) a rolling lobe airspring operatively mounted surrounding said damper means to form a sealed pneumatic working cavity therearound, said airspring including an upper retainer, an airspring piston, having a centering, spaced axially away from said upper retainer, a flexible air impervious member having a first end sealably attached to said upper retainer and a second end sealably attached to said piston forming the sealed pneumatic working cavity therebetween, said working cavity being pressurized to radially inflate said flexible member to and inflated radius, a rigid partial restraining sleeve fixedly attached to said upper retainer and extending circumferentially less than the total circumference of said flexible air imperious member, said rigid sleeve having a radius measured from the centerline when fixedly attached which is less than the inflated radius of the flexible member, said rigid sleeve functioning to radially retrain less than the whole circumference of the membrane to provide s die load force, wherein said airspring piston centerline is oriented at an acute angle relative to the rotational axis of said damper means.

3. A suspension strut according to claim 1 wherein said centerline and said rotational axis intersect at said attachment point of said rod to said sprung portion of said suspension.

* * * * *